United States Patent Office 2,986,507
Patented May 30, 1961

2,986,507

PREPARATION OF ACRYLIC-TYPE POLYMERS WHICH ARE INSOLUBILIZED IN SITU AFTER POLYMERIZATION AND END PRODUCT APPLICATION

Naomi S. Steck, Bristol, Pa., assignor to Rohm & Haas Company, Philadelphia, Pa., a corporation of Delaware No Drawing. Filed Oct. 30, 1957, Ser. No. 693,255

18 Claims. (Cl. 204—158)

This invention relates to the polymerization of acrylic-type monomers. By the term "acrylic-type," which expression will appear throughout the following specification and claims, it should be understood that reference is made to either acrylic or methacrylic materials or mixtures of both.

More particularly, the present invention is concerned with a process whereby the acrylic-type monomers are subjected first to a full-scale or substantially complete polymerization treatment, generally by well-known thermal or free radical polymerization techniques, and then to a novel post-polymerization irradiation treatment in order to obtain an insoluble polymer. In this process, no cross-linking monomer is required or used in accomplishing the insolubilization of the polymer. Instead, a photoinsolubilizing agent is uniquely added to the polymerizable mixture, the photoinsolubilizer remaining unaffected as the soluble polymer is formed but ready to cause insolubilization by irradiation after the polymer has been employed in its desired end application.

Furthermore, the invention will be understood to involve a two-step process in which the second, or insolubilization step, is effected in situ. That is, insolubilization is accomplished after the initially polymerized (but still soluble and fusible) composition is employed in its intended end application such as a molded, cast, extruded, filmed, spun, granulated, carved, machined, filamentous, fibrous, or other geometrically shaped object, or as a coating on metal, wood, paper, plastic, etc.

In the past, it has been known to prepare compositions, such as coating materials and the like, which consisted primarily of an acrylate or methacrylate which had been mixed with a thermal catalyst and partially polymerized to a syrup, and then a photo-polymerizing agent and a cross-linking monomer were added. In some modifications of this prior art process, the photopolymerizer and/or the cross-linking monomer were/was added to the monomer along with the thermal catalyst. In all of these and related processes, the intermediate product formed was a syrup in which, generally, from 10 to 15% of the monomer had been thermally converted to the polymer. Generally, no more than about 25% conversion or polymerization was allowed to take place, or else the material would have been permanently "set" and unable to be employed as a coating, or cast, etc. These partially polymerized mixtures were then employed for their intended purposes, and subsequently irradiated so as to permit the photopolymerizer present in the mixture to complete the job of polymerization. The end product of this process was, due to the cross-linking monomer present, an insoluble polymer. Examples of this type of in situ polymerization can be found described in United States Patents 2,367,660, 2,413,973, 2,448,828, 2,505,067 and British Patent 574,692.

Although the above-described prior art processes have proven satisfactory for their intended purposes, their applications are limited. For example, the partially polymerized products of those processes cannot be employed in the manufacture and utilization of molding or other forming powders. Because of this, such powders have had to be made by other processes from fully polymerized, but soluble, fusible, linear polymers. Obviously, insoluble, infusible polymers cannot be used because it would be impossible to mold forms or otherwise make end products of different shapes from such materials.

As a case in point, a unique thermopile has been developed which, although it is not in itself the subject of the present application, is of interest herein because it could not have been made without the benefit of the present invention. This thermopile, which is described in Example 12 in sufficient detail to illustrate the application of the present invention thereto, is used for studying the progressive heat-change characteristics of a monomer as it is being polymerized. The thermopile has a number of conductive wires which have to be encased in a plastic material, such as methyl methacrylate, near but not exposed to its outer surface. In order to imbed the wires in the plastic, the acrylic material must be in a thermoplastic state. However, if left in this condition, there is encountered the risk of ruining the thermopile as it frequently can happen that the monomer being studied breaks loose from its receptacle and comes into contact with the wire-containing plastic portion of the thermopile. The monomer, in such instances, attacks and dissolves the thermoplastic polymer. Now, by means of the present invention, after the wires are imbedded in the fusible polymer containing an insolubilizer, they are covered with an additional layer of polymer containing a photoinsolubilizing agent, and then irradiated so as to make that material completely insoluble.

To illustrate further the state of the prior art and the need for the present invention, objects made from solid, soluble, fusible polymers are quite useful, except when they are subject to attack by solvents. For instance, it is well known that plastic automobile reflectors and lenses made from acrylic-type materials often become cracked or develop a "crazed" appearance if gasoline or aromatics should drip on them. The present invention tends to solve such problems because it makes possible the use of completely polymerized, solid, soluble, fusible materials as molding powders, and provides for their insolubilization after objects have been molded to their final form from those powders.

Another instance of the widespread applications for the present invention is as follows. Whereas it previously was impossible to form satisfactory end products from solid, soluble, fusible polymers by such means as extrusion, spinning, rolling, filming, granulating, etc., the present invention makes this both possible and practical. Now the solid, soluble, fusible polymeric materials can be shaped into fibers, filaments, rods, tubes, sheets, spherical granules, and the like, and afterwards irradiated in situ to insolubilize the end products.

Following is still another example of the unique advantages of this invention. If one wishes to engrave or carve intricate shapes and/or designs on solid, fully formed or shaped acrylic plastic objects without the use of cutting tools, a feat that heretofore was impossible, it is now a simple, efficient, and economical expedient when done in accordance with the present invention. The most intricate filigrees can be made by masking a completely polymerized, but soluble acrylic product, applying to the product a stencil bearing the desired design, exposing the object to the required irradiation, removing the stencil, and placing the object in a suitable solvent for the acrylic polymer. The part which was masked by the stencil and thus received no irradiation will dissolve because it is still soluble, leaving behind the irradiated, and thus insolubilized polymer, displaying the desired design or filigree.

One more example of the utilization of this invention is in the formation of ion-exchange resins. Such resins can be made from polymerizable or copolymerizable materials which either carry ion-exchange groups or which can be converted to compounds that contain ion-exchange functional groups in the well-known manner. No cross-linking, di-functional monomer is necessary. Instead, the photoinsolubilizer of the present invention is incorporated with the other reactants in the resin mix. The granular resin beads are then made in the normal way, the only difference being that the resulting beads are composed of soluble but fully polymerized materials. After irradiation, the beads are insolubilized and then are capable of performing in ion-exchange operations.

From what has been said above with regard to the disadvantages or shortcomings of the prior art, particularly in comparison with the advantages and improvements which the present invention has made possible, the various objects of my invention and the general mode of their accomplishment are undoubtedly apparent. To state them specifically, however, it may be said first that a principal object is to produce finished end items from solid but soluble and fusible acrylic-type materials, or to make coating compositions therefrom. A major consideration of this object is that the solid products shall be capable of being shaped while in a soluble or fusible state into a desired final form configuration, the coating compositions shall be capable of being readily applied in a soluble state to both plastic and non-plastic base materials, and both categories of materials shall be capable of being insolubilized after such shaping or application.

Another object is to provide a method for making insoluble acrylic polymers, and end objects therefrom, without the use of any cross-linking type monomer.

Still another object is to prepare acrylic-type polymers which are not only thoroughly resistant to degradation caused by the sun's rays, in general, and ultraviolet radiation, in particular, but also actually will become even more stable when submitted to such exposure.

Additional objects will become apparent from a consideration of the balance of the specification and of the claims appended hereto.

The foregoing objects may be accomplished in accordance with the present invention which essentially comprises the following steps:

(1) Mix together an acrylic type monomer having only one polymerizable group, a thermal catalyst for polymerizing the monomer, and a specifically indicated photoinsolubilizing substance;

(2) By thermal treatment, effect substantially complete polymerization of the mixture to form a solid, soluble, fusible polymer;

(3) Employ the polymer in the desired end application, i.e., shape it into sheets, films, rods, granules, molds, casts, etc., or apply it as a coating, by any conventional or other means such as by extruding, molding, spinning, casting, brushing, rolling, etc.; and (4) Expose the yet soluble polymer to sunlight or to ultraviolet irradiation so as to energize the photoinsolubilizer and thereby insolubilize the polymer in situ.

From the process as just outlined, it will be readily apparent how the present invention is capable of accomplishing all of the foregoing objects. It will be readily understood that the inclusion of a di-functional monomer, as proposed in the prior art, is not only not contemplated but also is specifically precluded from the process of my invention. Such a monomer, if added in an amount which will cause cross-linking of the polymer at any stage of polymer formation, would defeat the principal purpose of the present invention. The cross-linker would produce an insoluble and infusible polymer which obviously would prevent the use of that polymer in shaping, forming, or coating operations.

When the present invention was discovered, extended efforts were made to determine its underlying mechanism and the extent of the substitutions which could be made for the various reactants that originally were employed. It was determined, for example, that acrylates and methacrylates having esterified alcohol groups from $C_1$ to at least $C_{18}$, or mixtures thereof, are preferred as the monomer in the novel process. Copolymers of such acrylic-type materials have been found to work satisfactorily. Other types of polymers, such as the styrenes, have been given consideration but thus far have eluded all efforts to function in accordance with the present invention, i.e., to insolubilize a styrene polymer by irradiation and without the aid of a chemical cross-linker as outlined above, although success has been achieved to the extent of grafting soluble monomeric styrene to an acrylic-type material and ending up with a completely insoluble "graft" polymer. The thermal catalyst used is apparently not critical because a number that are well known to the art will work satisfactorily in the present invention. These include, for example, benzoyl peroxide, lauroyl peroxide, acetyl peroxide, 2,2'-azo-bis-isobutyronitrile, etc., and mixtures thereof.

It has been convincingly demonstrated that only the thermal catalyst enters into conversion of the monomer to the polymer in this process; i.e., that the photoinsolubilizers employed in the present invention, unlike the photopolymerizers or other photo-catalysts of the prior art, do not have anything to do with polymerizing the monomer—their sole function is to insolubilize the already polymerized, solid, but soluble and fusible material. This demonstration was provided by performing residual monomer tests, i.e., tests to determine the unsaturation in the finished polymer. For example, using control polymers which contained a thermal catalyst in each instance but no photoinsolubilizer, it was determined that the finished polymers (after thermal treatment but before irradiation) contained from 0.7 to 0.9% residual monomer. Similarly, identically prepared polymers—except for the inclusion of a photoinsolubilizer—were also found to contain 0.7 to 0.9% residual monomer. Further substantiation was obtained by studies of the polymerization rates of these two types of polymers which indicated quite clearly that the photoinsolubilizers are entirely inactive in the absence of light even though under thermal conditions.

Temperature appears to be a factor only insofar as it is incident to the polymerization step by means of the thermal catalyst. In the post-polymerization step of insolubilization, temperature is not a requirement. The only heat involved is that given off by the ultraviolet lamps or by the sun if outdoor irradiation is utilized. Pressure and oxygen are not critical, either. Although most of the experiments were performed under atmospheric conditions, tests were made which clearly indicated that the present invention is operative and insolubilization achieved even if the object being irradiated is placed in a substantial vacuum.

Numerous photo-active additives, photo-catalysts, or photo-sensitizers have been known to the prior art. In the main, they have been used as photopolymerizers, insofar as their use in polymer chemistry has been concerned. When it developed that benzoin, a well-known and widely used photopolymerizer, had been found to work satisfactorily as the photoinsolubilizer in the present invention, it seemed natural to assume that all such agents which heretofore had been found to function as photopolymerizers of acrylic monomers also would be found to function as photoinsolubilizers of polymerized, but still soluble, fusible acrylic polymers. A number of them did, but quite surprisingly a number of them did not. For example, diacetyl and octanedione, two well-known photopolymerizers were found to be useless as photoinsolubilizers. Furthermore, it was found that many of the photoinsolubilizers, which cause insolubilization of the completely polymerized polymers following their irradiation, will not act as photopolymerizers for the polymerization of the monomers.

A large number of seemingly likely candidates for the job of the photoinsolubilizer in the present invention were tried, each at various concentrations. It was found that a preferable range of concentration was from about 0.01 to about 10% of the photoinsolubilizer by weight of the monomer. In most instances, an amount in this range caused the invention to work satisfactorily with a minimum of time and intensity of light. Actually, even more could be used in some cases, limited almost solely by the degree of the photoinsolubilizer's solubility in the monomer. Table I, which follows, gives some idea of the photoinsolubilizers which function in accordance with this invention, and at the same time shows by comparison a number of related but unsatisfactory componds and a few perfectly satisfactory photopolymerizers which are of no use as photoinsolubilizers. The data for that table were obtained as follows. Various acrylic polymers, each fully polymerized by conventional thermal means, and each containing one of the compounds listed in Table I, were exposed to the radiation of lamps supplying ultraviolet light. The particulars as to the various conditions in these experiments are illustratively described in the numerous examples at the end of this specification. The materials thus found to effect insolubilization of previously polymerized, but still soluble, fusible polymers, as well as some of the photopolymerizers which were found not to be effective, are as follows:

TABLE I.—EFFECT OF IRRADIATION ON THERMALLY POLYMERIZED ACRYLIC POLYMERS CONTAINING SELECTED ADDITIVES

| Additive | Effect |
| --- | --- |
| Aldehydes: | |
| Benzaldehyde | Insol.[1] |
| p-Hydroxybenzaldehyde | Insol. |
| o-Hydroxybenzaldehyde | Sol.[2] |
| Anisaldehyde | Insol. |
| p-Chlorobenzaldehyde | Insol. |
| o-Chlorobenzaldehyde | Insol. |
| 2,4-Dichlorobenzaldehyde | Insol. |
| p-Nitrobenzaldehyde | Sol. |
| Naphthaldehyde | Sol. |
| p-Dimethylaminobenzaldehyde | Insol. |
| Furfural | Insol. |
| Ketones: | |
| Methylethylketone | Sol. |
| Acetophenone | Insol. |
| p-Aminoacetophenone | Insol. |
| o-Hydroxyacetophenone | Sol. |
| m-Nitroacetophenone | Sol. |
| Benzalacetophenone | Sol. |
| Propiophenone | Insol. |
| p-Aminopropiophenone | Insol. |
| Benzophenone | Insol. |
| p-Hydroxybenzophenone | Insol. |
| 4-Chlorobenzophenone | Insol. |
| p-Hydroxyvalerophenone | Insol. |
| Desoxybenzoin | Insol. |
| Benzoin | Insol. |
| Benzil | Insol. |
| Xanthone | Insol. |
| 1,3-Indanedione | Insol. |
| Octanedione | Sol. |
| Diacetyl | Sol. |
| Other: | |
| Benzene | Sol. |
| Toluene | Sol. |
| Benzoic acid | Sol. |
| Methylbenzoate | Sol. |
| Methylsalicylate | Sol |
| Acetanilide | Sol. |
| p-Toluamide | Sol. |
| Phenylsalicylate | Sol. |
| Phenylbenzoate | Insol. |

[1] Insol.=Insoluble in ethylene dichloride at 25° C.
[2] Sol.=Soluble in ethylene dichloride at 25° C.

NOTES:—(1) The groupings under headings "aldehydes," "ketones," etc., in the above table are merely arbitrary divisions for convenience of reference, and have no known functional significance. (2) Specimens were irradiated for periods of time ranging from less than a minute to about 24 hours, as required, i.e., until insolubility was achieved. o-Chlorobenzaldehyde, for example, took just a few minutes. Two compounds, p-dimethylaminobenzaldehyde and propiophenone, took between one day and a week. Most of the others required only a few minutes. (3) The time required was reduced either by employing a larger amount of the photoinsolubilizer or by increasing the intensity of the irradiation source, or both. (4) The irradiation was done in a unit which held the specimen between two 20-watt Westinghouse Electric and Manufacturing Company fluorescent-type sunlamps, spaced 2½ inches apart, and in another unit which had four such lamps. These lamps produce a light which has a peak wavelength of 310 millimicrons. In other tests run with lights of peak wavelengths from 255 to 600 millimicrons, it was further discovered that only wavelengths of light between about 280 to about 500 millimicrons are acceptably effective in causing insolubilization. (5) Further details are illustratively disclosed in the numerous examples of actual experiments set forth below.

As an indication of the effectivenes of the present invention, a comparison was made of the results of attempts to dissolve in ethylene dichloride a representative number of different acrylic-type soluble polymers prepared in accordance with the invention. Samples of each of these polymers, both untreated and treated with ultraviolet irradiation, were submitted to standard solution viscosity tests employing a modified Ostwald viscometer. A solution, having a concentration of 2 grams/liter in ethylene dichloride, was made of the solid untreated polymer and determinations made of the reduced specific viscosity of each sample in liters/gram. The results are shown in Table II, which follows:

TABLE II.—EFFECT OF ULTRAVIOLET RADIATION ACRYLIC TYPE POLYMERS

| Polymer [1] (Fully, Thermally Polymerized with Acetyl Peroxide) | Reduced Specific Viscosity (l./g.) at 2 g./l. Concentration in Ethylene Dichloride at 25° C. | |
| --- | --- | --- |
| | Untreated | Treated [2] |
| Methyl methacrylate | 1.56 | Insol. |
| Ethyl methacrylate | 1.28 | Insol. |
| Butyl methacrylate | 0.46 | Insol. |
| Ethyl acrylate | 1.11 | Insol. |
| 70% Butyl acrylate / 30% Methyl methacrylate | 0.07 | Insol. |
| Methyl acrylate (piece having saw marks on edges) | Greatly swollen. | Slightly swollen with saw marks and edges well defined. |

[1] Approximately 1.0% of o-chlorobenzaldehyde was included in each case.
[2] After 24 hours of ultraviolet radiation.

The data in Table II show very clearly the insolubilization effect which ultraviolet radiation has on solid, fully polymerized acrylic polymers containing a photoinsolubilizer. Specimens of the various polymers which were thus insolubilized were also tested for insolubility in chlorinated hydrocarbons, esters, ketones, amides, acids, and alcohols. In each instance they were found to be just as insoluble as they were in ethylene dichloride.

The process of the present invention and the wide range of alternative conditions which may be employed will be more readily understood from the following examples and tables:

*Example 1.—Effect of varying concentrations of photoinsolubilizer*

Methyl methacrylate monomer containing 0.024% of a 25% solution of acetyl peroxide and o-chlorobenzaldehyde were polymerized at 70° C. The amount of the photoinsolubilizer was varied in each of a number of such experiments as shown in Table III. Viscosity determinations were made on the original polymer and after it had been irradiated under a Westinghouse dual fluorescent sun lamp unit as described above for 24 hours.

TABLE III

| Percent o-Chlorobenzaldehyde | Reduced Specific Viscosity (l./g.) at 2 g./l. Concentration in Ethylene Dichloride at 25° C. | |
|---|---|---|
| | Untreated | Treated |
| 0.00 | 1.31 | 0.86 |
| 0.001 | 1.24 | 0.79 |
| 0.01 | 1.32 | Insol. |
| 0.10 | 1.29 | Insol. |
| 1.00 | 1.19 | Insol. |
| 3.00 | 1.20 | Insol. |
| 5.00 | 1.14 | Insol. |
| 10.00 | 0.80 | Insol. |
| 20.00 | 0.59 | Insol. |
| 30.00 | 0.45 | Insol. |

The same experiments as described above were repeated except for the use of different photoinsolubilizers. The results are shown in Tables IV-X, inclusive.

TABLE IV

| Percent Acetophenone | Untreated | Treated |
|---|---|---|
| 0.00 | 1.11 | 0.61 |
| 0.001 | 1.09 | 0.69 |
| 0.01 | 1.08 | 0.41 |
| 0.10 | 1.10 | 0.63 |
| 1.00 | 1.11 | Insol. |
| 3.00 | 1.12 | Insol. |
| 5.00 | 1.08 | Insol. |
| 10.00 | 1.01 | Insol. |
| 20.00 | 0.80 | Insol. |
| 30.00 | 0.53 | Insol. |

TABLE V

| Percent Benzoin | Untreated | Treated |
|---|---|---|
| 0.00 | 1.01 | 0.64 |
| 0.001 | 1.04 | 0.62 |
| 0.01 | 1.09 | 0.66 |
| 0.10 | 1.09 | Insol. |
| 1.00 | 0.96 | Insol. |
| 3.00 | 0.82 | Insol. |
| 5.00 | 0.69 | Insol. |
| 10.00 | 0.47 | Insol. |
| 20.00 | 0.30 | Insol. |

TABLE VI

| Percent p-Hydroxybenzaldehyde | Untreated | Treated |
|---|---|---|
| 0.00 | 1.01 | Sol. |
| 0.001 | 1.00 | Sol. |
| 0.01 | 1.02 | Sol. |
| 0.10 | 1.00 | Insol. |
| 1.00 | 0.96 | Insol. |
| 3.00 | 0.75 | Insol. |
| 5.00 | 0.70 | Insol. |
| 10.00 | 0.53 | Insol. |

TABLE VII

| Percent p-Chlorobenzaldehyde | Untreated | Treated |
|---|---|---|
| 0.00 | 0.87 | Sol. |
| 0.001 | 0.80 | Sol. |
| 0.01 | 0.81 | Insol. |
| 0.10 | 0.81 | Insol. |
| 1.00 | 0.79 | Insol. |
| 3.00 | 0.41 | Insol. |
| 5.00 | 0.39 | Insol. |
| 10.00 | 0.35 | Insol. |

TABLE VIII

| Percent Anisaldehyde | Untreated | Treated |
|---|---|---|
| 0.00 | 1.07 | Sol. |
| 0.001 | 1.14 | Sol. |
| 0.01 | 1.04 | Insol. |
| 0.10 | 1.03 | Insol. |
| 1.00 | 0.98 | Insol. |
| 3.00 | 0.86 | Insol. |
| 5.00 | 0.69 | Insol. |

TABLE IX

| Percent 2,4-Dichlorobenzaldehyde | Untreated | Treated |
|---|---|---|
| 0.00 | 1.07 | Sol. |
| 0.001 | 1.11 | Sol. |
| 0.01 | 1.04 | Insol. |
| 0.10 | 1.04 | Insol. |
| 1.00 | 1.02 | Insol. |
| 3.00 | 1.00 | Insol. |
| 5.00 | 0.95 | Insol. |
| 10.00 | 0.83 | Insol. |

TABLE X

| Percent Propiophenone | Untreated | Treated |
|---|---|---|
| 0.001 | 1.04 | Sol. |
| 0.01 | 1.07 | Sol. |
| 0.10 | 1.06 | Sol. |
| 1.00 | 1.05 | Insol. |
| 3.00 | 0.99 | Insol. |
| 5.00 | 0.96 | Insol. |
| 10.00 | 0.83 | Insol. |

*Example 2.—Effect of varying the time of irradiation under ultraviolet light*

Methyl methacrylate monomer containing 0.024% of a 25% solution of acetyl peroxide and 0.10, 3.0, and 5.0% of o-chlorobenzaldehyde was polymerized at 70° C. The resultant polymers were irradiated for various times in separate experiments, each one under two 20-watt Westinghouse sunlamps in a unit as described above, and then dissolved in ethylene dichloride. The results are shown in Table XI.

TABLE XII

| Time of Irradiation | 0.1% o-Chlorobenzaldehyde | 3.0% o-Chlorobenzaldehyde | 5.0% o-Chlorobenzaldehyde |
|---|---|---|---|
| 30 seconds | Sol. | Sol. | Sol. |
| 1 minute | Sol. | Sol. | Sol. |
| 5 minutes | Sol. | Gelling | Gelling. |
| 7 minutes | Gelling | Insol. | Insol. |
| 10 minutes | Insol. | Insol. | Insol. |
| 20 minutes | Insol. | Insol. | Insol. |
| 40 minutes | Insol. | Insol. | Insol. |
| 60 minutes | Insol. | Insol. | Insol. |
| 24 hours | Insol. | Insol. | Insol. |
| 1 week | Insol. | Insol. | Insol. |

*Example 3.—Effect of varying the intensity of ultraviolet light*

Samples of polymethyl methacrylate containing 0.1% o-chlorobenzaldehyde were subjected to ultraviolet light in separate experiments, each at two different intensities. Two Westinghouse sunlamps were used in one series of tests, the specimens being supported at 1¼ inches from the lamps where the intensity of the light was 2,000 microwatts/cm.$^2$. The manner of support was such that the lamps were equidistantly spaced from the top and bottom surfaces of the sample. In another series of tests, four such lamps were arranged so that the sample could be irradiated at about ½ inch from each lamp. In this series the samples received light having an intensity of about 6,000 microwatts/cm.$^2$. Both series of tests were run so that individual samples were irradiated for periods of time which differed from one another, and the samples were subsequently placed in ethylene dichloride to check their solubility. The results are shown in Table XII.

TABLE XII

| Time of Irradiation | Test No. 1 (2,000 Microwatts/cm.$_2$) | Test No. 2 (6,000 Microwatts/cm.$_2$) |
|---|---|---|
| 30 seconds | Sol | Sol. |
| 1 minute | Sol | Sol. |
| 2 minutes | Sol | Sol. |
| 3 minutes | Sol | Insol. |
| 5 minutes | Sol | Insol. |
| 7 minutes | Insol | Insol. |
| 10 minutes | Insol | Insol. |

*Example 4.—Insolubilization of long chain acrylate and methacrylate polymers*

(a) Cetyl-stearyl methacrylate samples, each containing 0.5% of a 25% solution of acetyl peroxide and varying amounts of o-chlorobenzaldehyde, were polymerized at 70° C., as was a control sample containing no photoinsolubilizer. The resulting polymers were irradiated for 24 hours under two Westinghouse sunlamps as described above. The products were then tested for insolubility in ethylene dichloride at 25° C. The results are shown in Table XIII.

TABLE XIII

| Percent of Photoinsolubilizer | Solubility of Polymer |
|---|---|
| 0.00 | Sol. |
| 1.00 | Insol. |
| 5.00 | Insol. |

(b) Cetyl-stearyl acrylate samples, each containing 0.5% of a 25% solution of acetyl peroxide and varying amounts of o-chlorobenzaldehyde, were polymerized at 70° C., as was a control sample containing no photoinsolubilizer. The resulting polymers were irradiated for 24 hours under two Westinghouse sunlamps as described above. The products were then tested for insolubility in ethylene dichloride at 25° C. The results are shown in Table XIV.

TABLE XIV

| Percent of Photoinsolubilizer | Solubility of Polymer |
|---|---|
| 0.00 | Very greatly swollen. |
| 1.00 | Slightly swollen. |
| 5.00 | Even less swollen. |

(c) Samples made of a mixture of 66% octyl methacrylate and 34% decyl methacrylate, each containing 1.0% of a 25% solution of acetyl peroxide and 1.0% of o-chlorobenzaldehyde, were polymerized at 70° C., as was a control sample containing no photoinsolubilizer. The resulting polymers were irradiated for 24 hours under a twin-sunlamp unit as described above. The products were then tested for insolubility in ethylene dichloride at 25° C. The results are shown in Table XV.

(d) Samples made of 100% octyl acrylate, each containing 0.3% of a 25% solution of acetyl peroxide and 1.0% of o-chlorobenzaldehyde, were polymerized at 70° C., as was a control sample containing no photoinsolubilizer. The resulting polymers were irradiated for 24 hours under a twin-sunlamp unit as described above. The products were then tested for insolubility in ethylene dichloride at 25° C. The results are shown in Table XV.

TABLE XV

[In the following examples 1.0% o-chlorobenzaldehyde was employed] [1]

| Polymer | Solubility in Ethylene Dichloride |
|---|---|
| Octyl methacrylate-decyl methacrylate (66/34) | Insol. |
| Octyl acrylate (100%) | Insol. |

[1] The control samples containing no photoinsolubilizer proved to be soluble in ethylene dichloride.

*Example 5.—Insolubilization of polymer irradiated while in vacuum*

A solid but soluble, thermally polymerized sample of polymethyl methacrylate containing 0.10% of o-chlorobenzaldehyde and no chemically-reactive cross-linking monomer was placed in a tube made from "Vycor" glass (trade name for a fused silica glass made by the Corning Glass Company, Corning, New York, which has the high light-transmission qualities of quartz). The glass enclosure was then evacuated to a pressure of 0.1 mm., by means of a vacuum pump, and sealed. The evacuated tube next was placed in the two-lamp ultraviolet irradiation unit described above, and the glass-enclosed polymer was thus irradiated for 24 hours. The tube then was opened under water and the fact that the vacuum was retained was confirmed. This specimen was then placed in ethylene dichloride and found to be insoluble. (NOTE.—In this example, the polymerization of the monomer, and the testing of the irradiated product for insolubility, were carried out under the same conditions as described in detail in Example 2.)

*Example 6.—Insolubilization of polymer prepared in emulsion*

Methyl methacrylate, to which 0.10% o-chlorobenzaldehyde was added, was made into an emulsion formulation. The emulsion was polymerized and the polymer recovered. One part of the polymer was washed with methanol, while another portion was not. Both samples were irradiated under the two-unit fluorescent sun-lamp as described above, and both were found to be insoluble when checked in ethylene dichloride.

*Example 7.—Insolubilization of acrylic coating resins*

A sample of a commercial coating resin consisting of 55% of methyl methacrylate and 45% of ethyl acrylate dissolved in toluene was supplemented by approximately 0.10% of o-chlorobenzaldehyde and thoroughly mixed. This material was then employed as a coating so as to form a film in the conventional manner as the toluene was permitted to evaporate. The film was then irradiated for 24 hours under the two-lamp unit described above. It was then found to be insoluble when checked in ethylene dichloride.

*Example 8.—Insolubilization of acrylic fibers*

A sample of polymerized but soluble fibers consisting of 43% ethyl acrylate and 57% methyl methacrylate, and another such fiber sample consisting of 13% ethyl acrylate and 87% methyl methacrylate, were each dipped in o-chlorobenzaldehyde, air dried, and then irradiated for 24 hours under the twin-sunlamp unit as described above. These fibers were found to be insoluble although some swelling occurred.

*Example 9.—Insolubilization of polymer by sunlight*

Samples of ethyl methacrylate containing 0.024% of a 25% solution of acetyl peroxide, and in some cases additionally containing 0.5% benzoin, were thermally polymerized and placed in an outdoor exposure so that the light from the sun could fall directly thereon. The reduced specific viscosity of the samples was measured after various times of exposure. The results are given in Table XVI below.

TABLE XVI

| | Reduced Specific Viscosity at 2 g./l. Concentration in Ethylene Dichloride, 25° C. (Liters/Gram) | | | | | | |
|---|---|---|---|---|---|---|---|
| | Un- treated | 1 day out- doors | 2 days out- doors | 4 days out- doors | 8 days out- doors | 16 days out- doors | 32 days out- doors |
| Control samples (no benzoin)_ | 1.45 | 1.38___ | 1.15___ | 1.15___ | 0.98___ | 0.84___ | 0.62. |
| 0.5% Benzoin_____ | 1.31 | Insol__ | Insol__ | Insol __ | Insol__ | Insol__ | Insol. |

*Example 10.—Effect of sunlight on polymers with respect to degradation thereof*

Polymers of acrylic-type materials have been known to become degraded, the chain structure apparently being disrupted, upon exposure to sunlight for several months. To test this factor on polymers which have been insolubilized in accordance with the present invention, large still-soluble sheets of polymethyl methacrylate, prepared as described in Example 9 with 0.5% benzoin, and other sheets containing 0.1% of o-chlorobenzaldehyde, were placed in an outdoor exposure under direct sunlight. These specimens were brought in at various intervals from one (1) day to one (1) year of exposure time. Each of these specimens proved to be insoluble when submitted to the ethylene dichloride test as described above.

*Example 11.—"Graft" polymerization, or attachment of styrene to acrylic polymer*

Polymethyl methacrylate containing 0.1% o-chlorobenzaldehyde was prepared in a mold, and uncatalyzed monomeric styrene was held against one surface of the methacrylate. The assembly was irradiated for 24 hours under the two-unit sunlamp described above. At the end of that time, the styrene monomer had been converted to a film of styrene polymer attached to the methacrylate sheet. Uncatalyzed monomeric styrene, placed in a similar mold under the sunlamp at the same time, did not polymerize. The styrene-methacrylate "graft" polymer was tested with ethylene dichloride, as described above, and found to be insoluble. In another test of insolubility, the "graft" polymer (of the polystyrene polymerized by ultraviolet light on the surface of the polymerized polymethyl methacrylate sheet) was extracted at room temperature with diethylamine which is a non-solvent for polymethyl methacrylate and a borderline solvent for polystyrene of any molecular weight. After standing for one week in this solvent, no polymer was found in the solvent. The foregoing seems to indicate that the styrene, which by itself has not been capable of being insolubilized in accordance with the present invention, is simultaneously caused to become insoluble when it is attached to an acrylic-type material that is being insolubilized with ultra-violet irradiation.

*Example 12.—Utilization of polymers of acrylic-type materials insolbilized in accordance with present invention*

From what has been set forth in the previois examples, the possible applications of the present invention are obviously manifold. It can be said, without fear of exaggeration, that the invention opens vast new fields of use for acrylic-type materials which hitherto were blocked off because the previously known methods for making them insoluble could only be employed prior to use of those materials in their end-product application. To illustrate one such use, there follows a description of a unique thermopile which, for all practical purposes, was able to be constructed only because the present invention made it possible to insolubilize in situ the acrylic-type material that was employed.

The novel thermopile was devised for determining heat changes and the rate thereof which occur as a monomer is polymerized. The thermopile essentially is constructed as follows. A circular, metallic head, on the order of a thin, flat cylinder or disk has perforations through the flat surfaces and spaced equidistantly all around the perimeter. Conductive wires extending through each of the perforations (one wire through each perforation) are bent back on both sides of the head so as to be parallel with its surface. The wires are insulated from the metallic head, and adjacent pairs thereof are joined together where they radially meet near the center on one side of the head. On the other (which may be called the upper) side of the head, one wire of each pair is connected in series to the wires of each other pair, and the resulting two lead wires are each connected to separate binding posts from which leads are run to a recording pyrometer.

A disc-shaped slab of soluble, fusible methyl methacrylate containing a photoinsolubilizer, which has the same diameter as the metallic head, is pressed against and then fastened by screws to the under surface of the head. In so pressing the plastic disc, the wires are carefully aligned in their proper position radially apart from one another. A preferred way is to fasten the disc to the head first, then force the wires through the openings in the head and then through the plastic disc, finally joining the ends of the wire pairs as described above and bending them back against and actually into the lower surface of the plastic disc. A coating of the same plastic composition is then brushed or otherwise applied to cover the wires and completely seal them in the plastic disc. The unit is then exposed to ultraviolet irradiation until the plastic is insolubilized, as described above.

To better understand why the present invention made this practical thermopile possible, it should be stated that the unit is employed by holding it adjacent to a thin cellophane container holding the monomer whose polymerization rate is to be studied. Frequently, that container breaks and the monomer leaks out. If the monomer contacts a soluble acrylic polymer encasing the thermopile's wires, it would attack and ruin the unit. In the past, when such thermopiles were made from polymeric materials which were cast or molded around the conductive wires, the plastic casings were, of course, soluble and fusible or else they could not have been formed about the wires. The present invention eliminated this problem by allowing the thermopile's plastic discs to be made in soluble, fusible form, the wires impregnated or impressed therein, and then insolubilized in situ. Dozens of thermopiles have since been made and, although leaks of monomers from test cells have occurred a number of times, no thermopile was damaged when the monomer contacted the insolubilized plastic disc.

ALTERNATE PROCEDURES

Alternate procedures have been developed which operate with success equivalent to the principal method described above. Their use is optional with those who would practice this invention. In one modification of the process, the photoinsolubilizer is left out when the acrylic-type monomer is mixed with the thermal catalyst and thermally polymerized to a solid, but soluble and fusible polymer. This polymer then is dissolved in a solvent, such as ethylene dichloride. The photoinsolubilizer is then added, and the solvent removed quite simply by evaporation, the polymer thereby becoming resolidified. Irradiation of this polymer is then carried out as in the examples set forth above to form the insoluble polymer.

In another modification, the fully polymerized, fully formed, soluble and fusible piece, is dipped into the photoinsolubilizer (which may itself be a liquid, or in a solution of the photoinsolubilizer in some suitable solvent therefor). After dipping, the piece is dried and subsequently irradiated to obtain an insoluble end product.

I claim:
1. A fully polymerized, solid, fusible composition of matter which, prior to being subjected to ultraviolet irradiation, is soluble in organic solvents but after sufficient ultraviolet irradiation is insoluble in such solvents, said polymer having been prepared from a non-crosslinking monomer selected from the class consisting of acrylates and methacrylates containing ester groups from $C_1$ to $C_{18}$ and mixtures thereof and having only one polymerizable group, a thermal catalyst for polymerizing the monomer, and a photoinsolubilizer which is energizable by ultraviolet irradiation so as to insolubilize the polymer.

2. The composition of claim 1 in which the photoinsolubilizer is selected from the group consisting of benzaldehyde, p-hydroxybenzaldehyde, anisaldehyde, p-chlorobenzaldehyde, o-chlorobenzaldehyde, p-dimethylaminobenzaldehyde, furfural, acetophenone, p-amino acetophenone, propiophenone, p-aminopropiophenone, benzophenone, p-hydroxybenzophenone, 4-chlorobenzophenone, desoxybenzoin, benzoin, benzil, xanthone, phenyl benzoate, 2,4-dichlorobenzaldehyde, p-hydroxyvalerophenone, and 1,3-indanedione.

3. The composition of claim 2 in which the photoinsolubilizer is present in an amount sufficient to cause insolubilization of the polymer, said amount being in the range of from about 0.01% by weight of the monomer up to its limit of solubility in the monomer.

4. The composition of claim 3 in which the range of the photoinsolubilizer is from about 0.01 to about 10% by weight of the monomer.

5. The composition of claim 2 in which the photoinsolubilizer is o-chlorobenzaldehyde.

6. The composition of claim 2 in which the photoinsolubilizer is acetophenone.

7. The composition of claim 2 in which the photoinsolubilizer is benzoin.

8. The composition of claim 2 in which the photoinsolubilizer is phenyl benzoate.

9. The composition of claim 2 in which the photoinsolubilizer is anisaldehyde.

10. The composition of claim 1 in which the photoinsolubilizer is capable of activation by irradiation with ultraviolet light having a wavelength of between 280 and 500 millimicrons.

11. The composition of claim 10 in which the photoinsolubilizer for the completely polymerized but soluble, fusible, polymer is present in a concentration of from about 0.01% by weight of the monomer up to its limit of solubility in the monomer.

12. The composition of claim 10 in which the photoinsolubilizer is present in a concentration of from about 0.01% to about 10.0% by weight of the monomer.

13. A process for preparing an insoluble polymer without the aid of any crosslinking monomer from a monomer selected from the class consisting of acrylates and methacrylates containing ester groups from $C_1$ to $C_{18}$ and mixtures thereof, and having only one polymerizable group, comprising mixing together the monomer, a thermal catalyst suitable for polymerizing the monomer, and at least about 0.01 percent, based on the weight of the monomer, of a photoinsolubilizer suitable when energized for insolubilizing solid but soluble, fusible polymers formed from acrylates and methacrylates, then thermally treating the mixture so as to effect substantially complete polymerization thereof and form a solid, fusible polymer which is soluble in organic solvents, and finally exposing the polymer to ultraviolet light irradiation so as to energize the photoinsolubilizer and thereby insolubilize the polymer.

14. The process of claim 13 in which the ultraviolet light employed has a wavelength of between 280 and 500 millimicrons.

15. The process of claim 13 in which the photoinsolubilizer employed is present in a concentration of from about 0.01% by weight of the monomer up to the limit of its solubility in the monomer.

16. The process of claim 13 in which the photoinsolubilizer employed is present in a concentration of from about 0.01% to about 10.0% by weight of the monomer.

17. The process of claim 13 in which the exposure to ultraviolet light is for a period of time ranging from about a few minutes to as much time as necessary to obtain substantial insolubilization of the polymer.

18. A process for attaching styrene as a "graft" polymer to a polymer from the class consisting of acrylates and methacrylates, comprising (1) placing uncatalyzed monomeric styrene into contact with a fully polymerized, solid, fusible composition of matter which, prior to being subjected to ultraviolet irradiation, is soluble in organic solvents but after sufficient ultraviolet irradiation is insoluble in such solvents, said polymerized composition having been prepared from a noncrosslinking monomer selected from the class consisting of acrylates and methacrylates containing ester groups from $C_1$ to $C_{18}$ and mixtures thereof having only one polymerizable group, a thermal catalyst for polymerizing the monomer, and a photoinsolubilizer which is energizable by ultraviolet irradiation so as to insolubilize the polymer, and (2) irradiating the styrene-acrylate, styrene-methacrylate materials, respectively, so as to polymerize the styrene and simultaneously insolubilize and securely bond the styrene and said fully polymerized composition together.

References Cited in the file of this patent

UNITED STATES PATENTS

| | | |
|---|---|---|
| 2,367,661 | Agre | Jan. 23, 1945 |
| 2,367,670 | Christ | Jan. 23, 1945 |
| 2,413,973 | Howk | Jan. 7, 1947 |
| 2,446,806 | Bernard | Aug. 10, 1948 |
| 2,484,529 | Roedel | Oct. 11, 1949 |
| 2,505,067 | Sachs | Apr. 25, 1950 |
| 2,666,025 | Nozaki | Jan. 12, 1954 |
| 2,678,285 | Browning | May 11, 1954 |
| 2,689,197 | Gerlich | Sept. 14, 1954 |
| 2,739,910 | McGarvey | Mar. 27, 1956 |
| 2,741,566 | Demme | Apr. 10, 1956 |
| 2,810,662 | Barnebey | Oct. 22, 1957 |

FOREIGN PATENTS

| | | |
|---|---|---|
| 750,923 | Great Britain | June 20, 1956 |